United States Patent [19]

Rosenberg et al.

[11] Patent Number: 4,550,878
[45] Date of Patent: Nov. 5, 1985

[54] DRIP IRRIGATOR WITH PRESSURE RESPONSIVE FLOW REGULATOR

[76] Inventors: Peretz Rosenberg; Avner Rosenberg, both of Moshav Beit Shearim, Israel

[21] Appl. No.: 558,432

[22] Filed: Dec. 6, 1983

[30] Foreign Application Priority Data

Jan. 7, 1983 [IL] Israel ........................................ 67635

[51] Int. Cl.⁴ ........................ B05B 15/00; E02B 13/00
[52] U.S. Cl. .................................... 239/542; 405/40
[58] Field of Search ................. 239/542, 547; 138/42, 138/43; 405/40, 43, 48

[56] References Cited

U.S. PATENT DOCUMENTS 4,011,893  3/1977  Bently .............................. 239/542 X
4,177,946 12/1979  Sahagun-Barragan ......... 239/542 X
4,193,545  3/1980  Havens ............................ 239/542 X

FOREIGN PATENT DOCUMENTS 2635606  2/1978  Fed. Rep. of Germany ...... 239/547

Primary Examiner—Jeffrey V. Nase
Assistant Examiner—Kevin Patrick Weldon
Attorney, Agent, or Firm—Benjamin J. Barish

[57] ABSTRACT

A fluid flow control device particularly useful as a drip irrigation emitter comprises a body member formed with at least two grooves in spaced parallel relationship separated by a separator wall, one of which grooves leads to the inlet and the other to the outlet; and a flexible member overlapping the two grooves and separator wall so as to meter the flow between the two grooves for substantially the complete length of the separator wall in response to the dynamic pressure of the flowing fluid.

17 Claims, 13 Drawing Figures

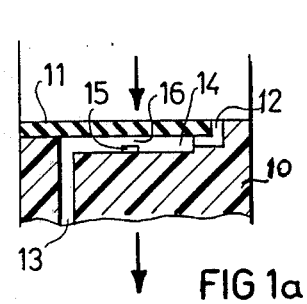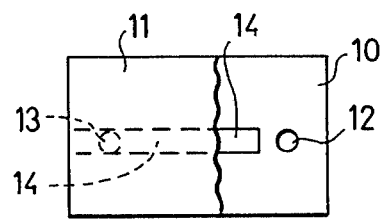
FIG 1a  FIG 1b
PRIOR ART
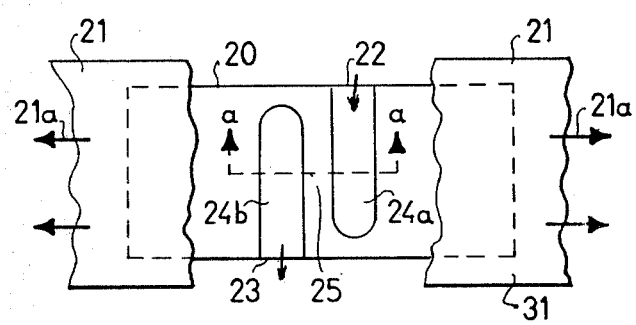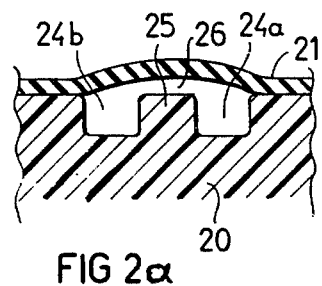
FIG 2
FIG 2a
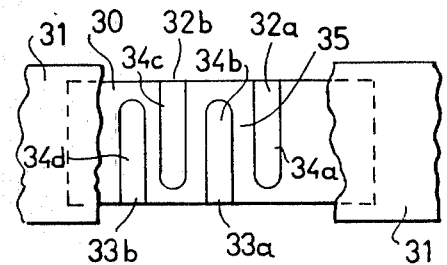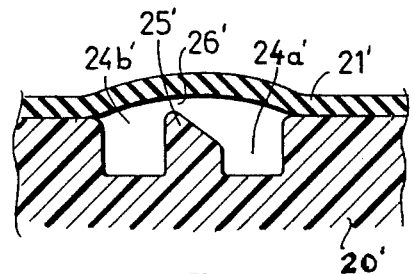
FIG 3
FIG 2b
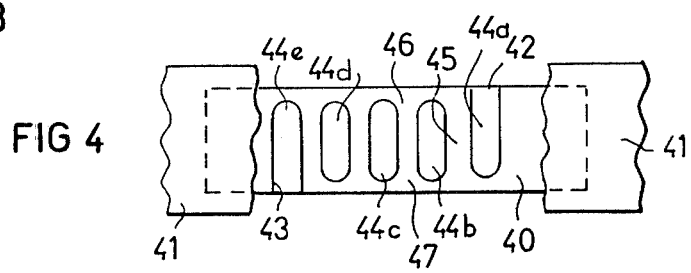
FIG 4

DRIP IRRIGATOR WITH PRESSURE RESPONSIVE FLOW REGULATOR

BACKGROUND OF THE INVENTION

The present invention relates to flow regulators, for regulating the flow of a fluid. The invention is particularly useful as a drip-irrigation emitter, and is therefore described below with respect to this application, but it will be appreciated that the invention could be used in other flow-regulation applications as well.

One well known type of flow regulator, particularly used for regulating the rate of water flow to a water sprinkler, sprayer or drip-irrigation emitter, includes a body member formed with an inlet opening, an outlet opening, and a groove defining a flow pathway interconnecting the two openings. Such a flow regulator further includes a flexible member, e.g., a resilient or elastic film or membrane, overlying the flow pathway so as to meter the flow there through in response to the dynamic pressure of the fluid. That is to say, one side of the resilient member is subjected to a relatively static pressure, usually the inlet pressure, and the other side (which contacts the face of the body member so as to overly the recesses through which the fluid flows) is subjected to the pressure of the fluid flowing through the recesses. The latter pressure is a dynamic one, varying with the rate of fluid flow; i.e., a higher rate of flow produces a lower pressure. Accordingly, an increase in the rate of flow through the recesses causes a reduction in the pressure applied to that face of the resilient member, and therefore the static pressure on the opposite face of the resilient member tends to move it deeper into the recess, thereby reducing its cross-sectional area and restricting the flow through it. Such regulators usually also include a stop within the flow passageway for limiting the inward displacement of the resilient member, such that the clearance between the stop and the inner face of the resilient member serves as the metering passageway for metering the flow of the fluid from the inlet to the outlet.

One drawback of such known flow regulators is that the above mentioned metering passageway is of relatively short length, so that small changes in this passageway produce relatively large changes in the flow rate. In addition, such a relatively short metering passageway is highly sensitive to clogging by foreign particles in the fluid. Further, such flow regulators are also highly sensitive to the stiffness of the flexible or resilient member because of the short metering passageway.

SUMMARY OF THE INVENTION

An object of the present invention is to provide a flow regulator having advantages in the above respects. Another object of the present invention is to provide a flow regulator which may be constructed as a drip-irrigation emitter also having advantages in the above respects.

According to a broad aspect of the present invention, there is provided a body member formed with an inlet opening from an edge thereof, an outlet opening from an edge thereof, and a flow passageway interconnecting the openings to produce a flow in a predetermined direction between said openings; and a flexible member overlying the flow passageway so as to meter the flow therethrough in response to the dynamic pressure of the fluid flowing therethrough. According to the invention, the flow passageway is defined by at least two grooves formed in spaced parallel relationship in the body member, which grooves are separated by a separator wall for a major portion of their length. One of the grooves is an outlet groove leading from the inner opening at its respective edge of the body and terminates short of the opposite edge, this inlet groove having a length transversely to the fluid flow direction which is substantially greater than its width parallel to the fluid flow direction. The other groove is an outlet groove, leading from the outlet opening at its respective edge of the body member and terminating short of the opposite edge. The outlet groove also has a length transversely to the fluid flow direction which is substantially greater than its width parallel to the fluid flow direction. The flexible member overlies the two grooves and separator wall so as to meter the flow between the two grooves for substantially the complete length of the separator wall and grooves in response to the dynamic pressure of the fluid flowing between the flexible member and the separator wall of the body member.

In the preferred embodiments of the invention described below, the flexible member is a resilient or elastic film or membrane.

Flow regulators constructed in accordance with the foregoing features provide a number of important advantages. Thus, the metering portion of the flow regulator is defined by the separator wall between the spaced parallel grooves, which separator wall could be constructed to have a substantial length. By thus increasing the length of the metering portion of the flow regulator, the accuracy of the flow regulation produced is substantially increased, and its sensitivity to clogging and to the stiffness of the flexible member is substantially decreased.

Several embodiments of the invention are described below wherein there are more than two of said grooves. In some embodiments, these grooves can be arranged so as to define a plurality of parallel paths for the fluid to flow from the inlet to the outlet, thereby further decreasing the sensitivity of the device to clogging. Other embodiments are described wherein the plurality of grooves are arranged so as to define a longer serial path for the fluid to flow from the inlet to the outlet, thereby permitting the grooves to be of larger cross-sectional area, which also permits increasing accuracy and reducing sensitivity to clogging.

According to a further feature in some of the described embodiments, the body member is of cylindrical configuration and is formed with the grooves on its outer circumference, and the flexible member is a band received over the outer face of the cylindrical body member to overly said grooves.

The invention also provides drip-irrigation emitters constructed in accordance with the foregoing features and having the same advantages as described above.

Further features and advantages of the invention will be apparent from the description below.

BRIEF DESCRIPTION OF THE DRAWINGS

The invention as herein described, by way of example only, with reference to the accompanying drawings, wherein:

FIGS. 1a and 1b are top plan views and longitudinal sectional views, respectively, illustrating one form of flow regulator known in the prior art;

FIG. 2 is a fragmentary plan view illustrating one form of flow regulator constructed in accordance with the present invention;

FIG. 2a is a sectional view of FIG. 2 along lines a—a;

FIG. 2b is a view corresponding to that of FIG. 2a but illustrating a modification;

FIGS. 3 and 4 are views corresponding to FIG. 2 illustrating two further forms of the flow regulators constructed in accordance with the present invention;

PRIOR ART CONSTRUCTION

Figure 5:
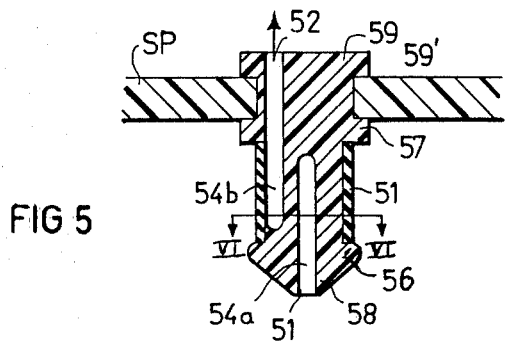
FIG. 5 is a longitudinal sectional view illustrating a further form of flow regulator particularly useful as a drip-irrigation emitter constructed in accordance with the present invention.

With reference first to FIGS. 1a and 1b illustrating a known prior-art construction of flow regulator, it will be seen that the regulator includes two main members, mainly a body member generally designated 10, and a flexible member, generally designated 11, commonly in the form of a thin resilient or elastic film or membrane of rubber or other elastomeric material. The body member 10 is formed with an inlet 12, an outlet 13, and a groove 14 interconnecting the inlet and outlet and serving as a passageway for the flow of the fluid from the inlet to the outlet. Such a passageway 14 commonly includes a stop 15, such as a rib or projecting, rising from the bottom of the groove but terminating short of its top, so as to provide a clearance 16 between the top edge and the underface of the resilient film 11.

Such a known flow regulator operates as follows: The pressure at the inlet 12 is also applied to the outer face of the resilient film 11 pressing it toward the stop 15, thereby tending to decrease the cross-sectional area of the clearance 16. This inlet pressure, however, is also applied to the fluid at the inlet side of the groove 14 formed in the body member, and thereby against the inner face of the resilient film 11 overlying this portion of the groove. This latter pressure is in the opposite direction from the inlet pressure applied to the outer face of the resilient film. The film is under some tension so that its inherent resiliency tends to maintain the clearance 16 through which the fluid passes from the inlet 12 to the outlet 13. Whereas the pressure applied to the outer face of the resilient film 11 is substantially static, depending on the inlet pressure, the pressure applied to the inner face of the resilient film 11 is dynamic, varying with the rate of flow of the fluid through the groove 14 and particularly through the clearance 16, the pressure decreasing with an increasing rate of flow. Accordingly, if the flow increases, the resilient film 11 is pressed by the pressure applied to its outer face towards stop 15, thereby decreasing the flow rate. In this manner, the flow through the groove from the inlet to the outlet is regulated to maintain a substantial constant rate.

As mentioned earlier, such a known flow-regulator construction is subject to a number of drawbacks because the flow is regulated primarily in the small-dimension clearance space 16. Thus, the precision of flow regulation is relatively low because small dimensional changes in this clearance 16 produce large changes in the flow rate, and also because the flow regulation depends to a great extent on the stiffness of the resilient film 11. In addition, such a known construction has a high sensitivity to clogging by foreign particles which become lodged within the small-dimensional clearance space 16, thereby decreasing or terminating the flow.

DESCRIPTION OF PREFERRED EMBODIMENTS

FIG. 2 illustrates one form of flow regulator constructed in accordance with the present invention which avoids the above drawbacks of the prior art construction. Thus, the novel flow regulator illustrated in FIG. 2 includes a body member 20 and a flexible member 21 in the form of a thin resilient elastic film or membrane applied under tension, as shown by arrow 21a, over the body member 20. The body member 20 is formed with an inlet 22, an outlet 23, a first groove 24a communicating with inlet 22, and a second groove 24b communicating with outlet 23. The two grooves 24a, 24b are in close space, parallel relationship to each other and are separated by a separator wall 25. The fluid entering inlet 22 therefore passes through groove 24a and then over the separator 25 to groove 24b leading to the outlet 23.

Thus, the complete length of the separator wall 25 between the two grooves 24a, 24b acts, with the overlying resilient film 21, as the metering passageway 26 (FIG. 2a), which passageway varies with the rate of flow to regulate the flow. That is, an increase in the flow through clearance 26 will cause the pressure on the respective face of the resilient film 21 to drop, thereby moving the latter film closer to separator wall 25 to reduce this clearance and the fluid flow through it, as described above with respect to the prior art construction of FIGS. 1a and 1b. However, the disadvantages of the latter prior art construction are not present in the FIG. 2 construction since the complet length of the separator wall 25 between the two parallel grooves 24a, 24b will be effective to meter the fluid, thereby increasing the accuracy of the fluid regulation, decreasing its sensitivity to the resiliency of film 21, and also reducing its sensitivity to clogging by foreign articles.

As shown in FIG. 2a, the upper edge of the separator wall 25, defining the clearance 26 with the resilient film 21, has a flat edge.

FIG. 2b illustrates a modification, wherein the upper edge of the separator wall indicated as 25' is tapered, preferably increasing in the direction of the inlet recess 24a' towards the outlet recess 24b', which further decreases its sensitivity to clogging and more accurately meters the flow rate. The body member 20' and resilient film 21' are otherwise the same as in FIG. 2.

FIG. 3 illustrates another flow regulator in accordance with the present invention, also including a body member, generally designated 30, and an overlying flexible or resilient film 31. In this case, the body member is formed with four grooves 34a–34d in spaced parallel relationship, each separated from the adjacent one by a separator wall 35. Alternate grooves 34a, 34c lead to the inlet constituted of the two openings 32a, 32b; and the remaining alternate grooves 34b, 34d, lead to the outlet constituted of the two openings 33a, 33b. It will thus be seen that inlet 32a, groove 34a, 34b, and outlet 33a define one parallel path for the fluid flow; and inlet 32b, grooves 34c, 34d, and outlet 33b, define a second parallel path for the fluid flow. Such an arrangement including two (or more) parallel paths for the fluid flow further reduces the sensitivity of the regulator to being clogged.

FIG. 4 illustrates a variation of FIG. 3, wherein the plural grooves define a single series path for the fluid flow, rather than a plurality of parallel paths. Thus, as shown in FIG. 4, the body member 40 is formed with five grooves 44a-44e; of these, end groove 44a leads to the inlet 42, and end groove 44e leads to the outlet 43. The intermediate grooves 44b-44d terminate short of the two sides of the body member so that, when covered by the overlying resilient film 41, they lead directly to neither the inlet 42 nor the outlet 43. Preferably, the resilient sheet 41 is pressed (by means not shown in FIG. 4) against the margins 46, 47 of the body member 40 on opposite sides of the intermediate grooves 44b-44d, so as to force the fluid to flow from the inlet groove 44a over the separator walls 45 and through the intermediate grooves 44b-44d in series before arriving at the outlet groove 44e.

This arrangement in FIG. 4 thus provides a single series path for the fluid to flow, which series path includes a plurality of metering areas, namely the clearances between each of the four separator walls 45 and the overlying resilient film 41. Such an arrangement defining a long series flow path enables the grooves, and also the clearances between their separator walls and the overlying resilient film, to be of larger cross-sectional area, thereby decreasing the sensitivity of the regulator to clogging while at the same time permitting very precise control of the regulation rate.

FIGS. 5-10 illustrate still further variations of the invention particularly as applied to drip-irrigation emitters.

Figure 6:
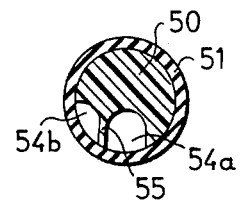
FIG. 6 is a transverse sectional view along lines VI—VI of FIG. 5.

Thus, FIGS. 5 and 6 illustrate the flow regulator embodied in a drip-irrigation emitter adapted to be inserted through an opening in the wall of a supply pipe SP. In this case, the drip irrigation emitter includes a body member 50 of cylindrical configuration formed on its outer surface with two axially-extending grooves 54a, 54b, in close parallel relationship spaced from each other by a separator wall 55 (see FIG. 6). Groove 54a leads to the inlet 51 of the emitter disposed within the supply pipe SP, and groove 54b leads to the outlet 52 of the emitter disposed externally of the supply pipe.

The flexible member overlying the grooves 54a, 54b in body member 50 is in the form of a resilient or elastic band 51 located and retained between a pair of ribs 56, 57 formed on the outer surface of the body member. The latter member is further formed with tapered inner tip 58 to facilitate its insertion through an opening in the wall of the supply pipe SP. The opposite end of the body member 50 is formed with another annular rib 59 which defines, with annular rib 57, an annular recess 59' for retaining the body member within the hole in the wall of the supply pipe.

It will thus be seen that when the body member 50, with the rubber band 51 applied over its recesses 54a, 54b, is inserted through the wall of the supply pipe SB, the pressurized fluid (e.g., irrigating water) will flow under pressure through the inlet opening 51 into the inlet groove 54a, and will then pass over the separator wall 55 into groove 54b and out through the outlet 52. The outer face of the resilient band 51 is subjected to the pressure of the fluid within the supply pipe SP, whereas the inner face of the rubber band 51, overlying the two grooves 54a and 54b and the separator wall 55, is subjected to a dynamic pressure varying with the rate of flow of the fluid, particularly through the clearance between the separator wall 55 and the inner face of the resilient band since this is the area of smallest cross-section and will therefore have the largest flow rate. Accordingly, if the flow increases, the pressure on the inner face of the resilient band 51 will decrease, thereby drawing the band closer to the outer face of the separator wall 55 to decrease the flow.

While the embodiment illustrated in FIG. 5 is particularly useful as a drip-irrigation emitter applied to a fluid supply pipe, it will be appreciated that it could be used in other flow-regulation applications, for example for regulating the flow of irrigation water to a sprinkler, sprayer, or the like.

Figure 8:
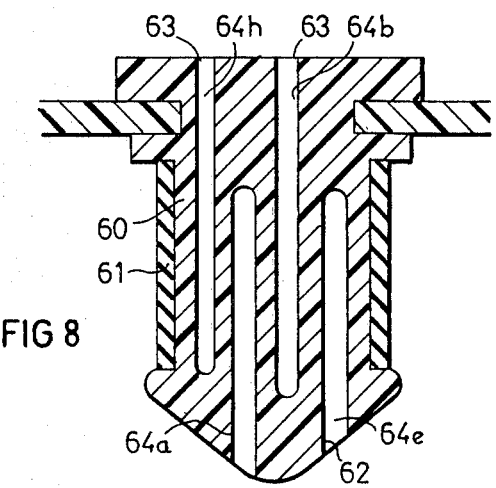
FIG. 8 is a longitudinal sectional view illustrating a parallel-path flow regulator corresponding to the sectional view of FIG. 7.
Figure 7:
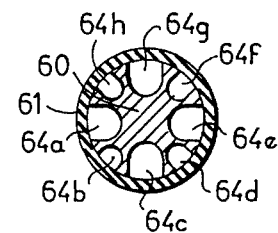
FIG. 7 is a transverse sectional view, illustrating a modification in the flow regulator of FIGS. 5 and 6.

FIGS. 7 and 8 illustrate a variation in the flow regulator of FIGS. 5 and 6, nemely in that the body member, therein designated 60, is formed with more than two grooves in its outer cylindrical face. In the case illustrated in FIGS. 7 and 8, there are eight such grooves 60a-60h, all enclosed by the resilient band 61. Alternate ones of the recesses (e.g., 64a, 64c, 64e, 64g) lead to the inlets 62 of the body member, and the remaining alternate ones lead to the outlets 63. Thus, the grooves define four parallel flow paths for the fluid, thereby providing the advantages described above with respect to the FIG. 3 embodiment.

Figure 9:
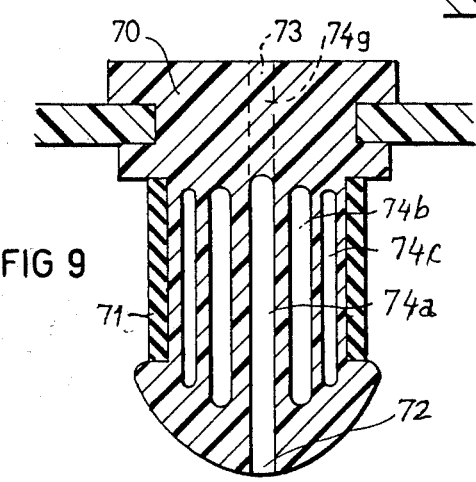
FIG. 9 is a longitudinal sectional view illustrating a series-path type flow regulator corresponding to the sectional view of FIG. 7.

FIG. 9 illustrates an arrangement similar to that of FIGS. 7 and 8, except that the grooves are disposed so that they define a series flow path, rather than a plurality of parallel flow paths, between the body member 70 and the resilient band 71 applied over the grooves. Actually in the arrangement illustrated in FIG. 9 the grooves define two parallel flow paths from the inlet 72 to the outlet 73, one such flow path including a plurality of the recesses in series extending around one-half the circumference of the body member, and the other extending around the other half of the circumference of the body member.

Thus, as shown in FIG. 9, one groove 74a leads directly to the inlet 72, and another groove 74g, on the diametrically opposite side of the body member 70, leads to the outlet 73. All the intermediate groove 74b, 74c, etc. lead directly neither to the inlet or outlet, thereby forcing the fluid to flow through the above-mentioned two paths, in parallel, one path being from inlet groove 74a to the outlet groove 74g in one direction, and the other path being from inlet groove 74a to the outlet groove 74a to the outlet recess 74g in the other direction.

Figure 10:
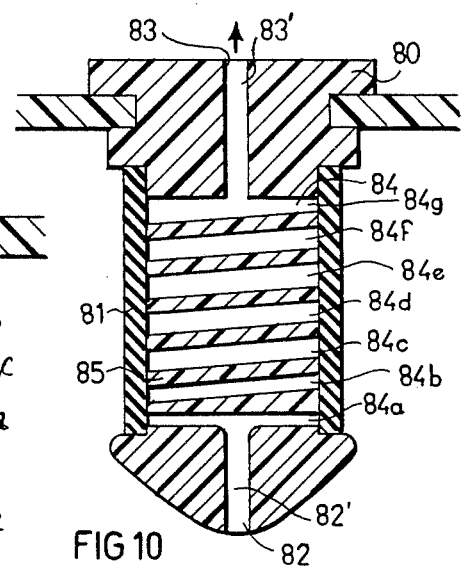
FIG. 10 is a longitudinaal sectional view illustrating a further form of flow regulator particularly useful as a drip-irrigation emitter constructed in accordance with the invention.

In the embodiments of the invention illustrated in FIGS. 5-9, all the above mentioned grooves extend axially of the cylindrical body member. These grooves, however, could also extend circumferentially of the body member. This is shown in FIG. 10, wherein the body member 80 is formed with a circumferential inlet groove 84a at one end leading to the inlet 82 via an axial extension 82', and with an outlet groove 84g at the opposite end leading to the outlet 83 via an axial extension 83'. In between the two grooves 84a and 84g, there are formed five intermediate grooves 84b -84f, each of which is of annular configuration so as to force the fluid flowing through the inlet 82 to traverse each such groove in series and to be regulated by the clearance between the separator walls 85 separating the adjacent grooves, and the resilient band 81 applied over the grooves.

While the invention has been described with respect to several preferred embodiments, it will be appreciated that many other variations, modifications and application of the invention may be made.

What is claimed is:

1. A flow regulator, comprising: a body member formed with an inlet opening from an edge thereof, an outlet opening from an opposite edge thereof, and a flow passageway interconnecting said openings to produce a flow in a predetermined direction between said openings; and a flexible member overlying said flow passageway so as to meter the flow therethrough in response to the dynamic pressure of the fluid flowing therethrough; the improvement wherein: said flow passageway is defined by at least two grooves formed in spaced parallel relation in said body member, which grooves are separated by a separator wall for a major portion of their length, one of said grooves being an inlet groove leading from said inlet opening at its respective edge of the body member and terminating short of the opposite edge, said inlet groove having a length transverse to said fluid flow direction which is substantially greater than its width parallel to said fluid flow direction; the other of said grooves being an outlet groove leading from said outlet opening at its respective edge of the body member and terminating short of the opposite edge, said outlet groove being parallel to said inlet groove and also having a length transverse to said fluid flow direction which is substantially greater than its width parallel to said fluid flow direction; said flexible member overlying the two grooves and said separator wall so as to meter the flow between the inlet groove and outlet groove, and substantially the complete length of said separator wall and grooves in response to the dynamic pressure of the fluid flowing between the flexible member and the separator wall of the body member.

2. A flow regulator according to claim 1, wherein both said grooves are substantially of linear configuration.

3. A flow regulator according to claim 1, wherein said flexible member is a resilient film.

4. A flow regulator according to claim 1, wherein said separator wall is formed with a substantially flat outer edge which, together with said flexible member, meters the fluid flow through said grooves.

5. A flow regulator according to claim 1, wherein said separator wall is formed with a pointed outer edge which, together with said flexible member, meters the fluid flow through said grooves.

6. A flow regulator according to claim 1, wherein there are only two of said grooves.

7. A flow regulator according to claim 1, wherein there are more than two of said grooves, alternate grooves leading to said inlet opening, and the remaining alternate grooves leading to said outlet opening, thereby providing at least two parallel paths for said fluid to flow from the inlet to the outlet.

8. A flow regulator according to claim 1, wherein there is at least one intermediate groove between said inlet and outlet grooves providing a serial path for the fluid to flow from the inlet opening to the outlet opening.

9. A flow regulator according to claim 1, wherein said body member is of cylindrical configuration and is formed with said grooves on its outer circumference, and said flexible member is a resilient band received over the outer face of said cylindrical body member to overly said grooves.

10. A flow regulator according to claim 1, wherein there are a plurality of said fluid flow passageways connected in parallel between said inlet and outlet openings formed in the outer face of said body member.

11. A flow regulator comprising: a body member formed with an inlet opening from an edge thereof, an outlet opening from an edge thereof, and a flow passageway interconnecting said openings to produce a flow in a predetermined direction between said openings; and a flexible member overlying said flow passageway so as to meter the flow therethrough in response to the dynamic pressure of the fluid flowing therethrough; the improvement wherein: said flow passageway is defined by two grooves formed in spaced parallel relationship in said body member, which grooves are separated by a single separator wall for a major portion of their length, one of said grooves being an inlet groove leading from said inlet opening at its respective edge of the body member and terminating short of the opposite edge, said inlet groove having a length transverse to said fluid flow direction which is substantially greater than its width parallel to said fluid flow direction; the other of said grooves being an outlet groove leading from said outlet opening at its respective edge of the body member and terminating short of the opposite edge, said outlet groove being parallel to said inlet groove and also having a length transverse to said fluid flow direction which is substantially greater than its width parallel to said fluid flow direction; said flexible member overlying the two grooves and said single separator wall so as to meter the flow between the two grooves for substantially the complete length of said separator wall and grooves in response to the dynamic pressure of the fluid flowing between the flexible member and the separator wall of the body member.

12. A flow regulator according to claim 11, wherein there are only two of said fluid flow passageways formed in the outer face of said body member leading from said inlet opening to said outlet opening.

13. A flow regulator according to claim 11, wherein said body member is of cylindrical configuration and is formed with annular ribs on opposite sides of its grooved outer face, said flexible member being a band received and retained between said annular ribs.

14. A flow regulator according to claim 13, wherein said cylindrical body member is further formed with an annular recess at one side of said grooved outer face for receiving the wall of a fluid supply pipe into which the cylindrical body member may be inserted, with its inlet located within the fluid supply pipe, and its outlet externally of the fluid supply pipe.

15. A flow regulator according to claim 13, wherein said grooves extend axially of said body member.

16. A flow regulator according to claim 13, wherein said grooves extend circumferentially of said body member.

17. A flow regulator according to claim 13, in combination with a water supply pipe, said flow regulator serving as a flow-regulated drip-irrigation emitter for emitting water from said water supply pipe.

* * * * *